US010038730B2

(12) United States Patent
Sawhney et al.

(10) Patent No.: US 10,038,730 B2
(45) Date of Patent: Jul. 31, 2018

(54) CONTEXTUALIZING INTERACTIONS IN WEB MEETING SESSIONS

(71) Applicant: ADOBE SYSTEMS INCORPORATED, San Jose, CA (US)

(72) Inventors: Himanshu Sawhney, Noida (IN); Bhaskar Priya, Ghaziabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 208 days.

(21) Appl. No.: 14/725,895

(22) Filed: May 29, 2015

(65) Prior Publication Data
US 2016/0352788 A1    Dec. 1, 2016

(51) Int. Cl.
*G06F 15/16*    (2006.01)
*H04L 29/06*    (2006.01)
*H04L 29/08*    (2006.01)

(52) U.S. Cl.
CPC ...... *H04L 65/1069* (2013.01); *H04L 65/4038* (2013.01); *H04L 63/08* (2013.01); *H04L 67/141* (2013.01)

(58) Field of Classification Search
CPC .......................... H04L 65/1069; H04L 65/403
USPC ....................................................... 709/204
See application file for complete search history.

(56) References Cited

U.S. PATENT DOCUMENTS

| 2004/0169683 | A1* | 9/2004 | Chiu | G06F 17/30017 |
| | | | | 715/776 |
| 2006/0171515 | A1* | 8/2006 | Hintermeister | G06Q 10/10 |
| | | | | 379/110.01 |

OTHER PUBLICATIONS

U.S. Appl. No. 14/311,668, filed Jun. 23, 2014, Title: Method and Apparatus for Timeline-Synchronized Note Taking During a Web Conference, 34 pp.

* cited by examiner

*Primary Examiner* — Normin Abedin
(74) *Attorney, Agent, or Firm* — Shook, Hardy & Bacon L.L.P.

(57) ABSTRACT

In various implementations, a computing device is configured to provide context to annotating inputs made during a web meeting session. In some implementations, a plurality of annotating inputs is received by a participant of a web meeting session. Each of the annotating inputs is processed to associate with a unique descriptor that corresponds to one or more of the participant, a web meeting session, a recording of at least a portion of the web meeting session, and a submitted time of the annotating input. Each annotating input is stored to generate an interaction record for referencing each annotating input to a web meeting session and, in some instances, a corresponding recorded portion of the web meeting session. In this regard, annotating inputs can be used to retrieve additional content (i.e., a portion of the recording) that is relevant to the annotating input and employed to provide additional context thereto.

19 Claims, 5 Drawing Sheets

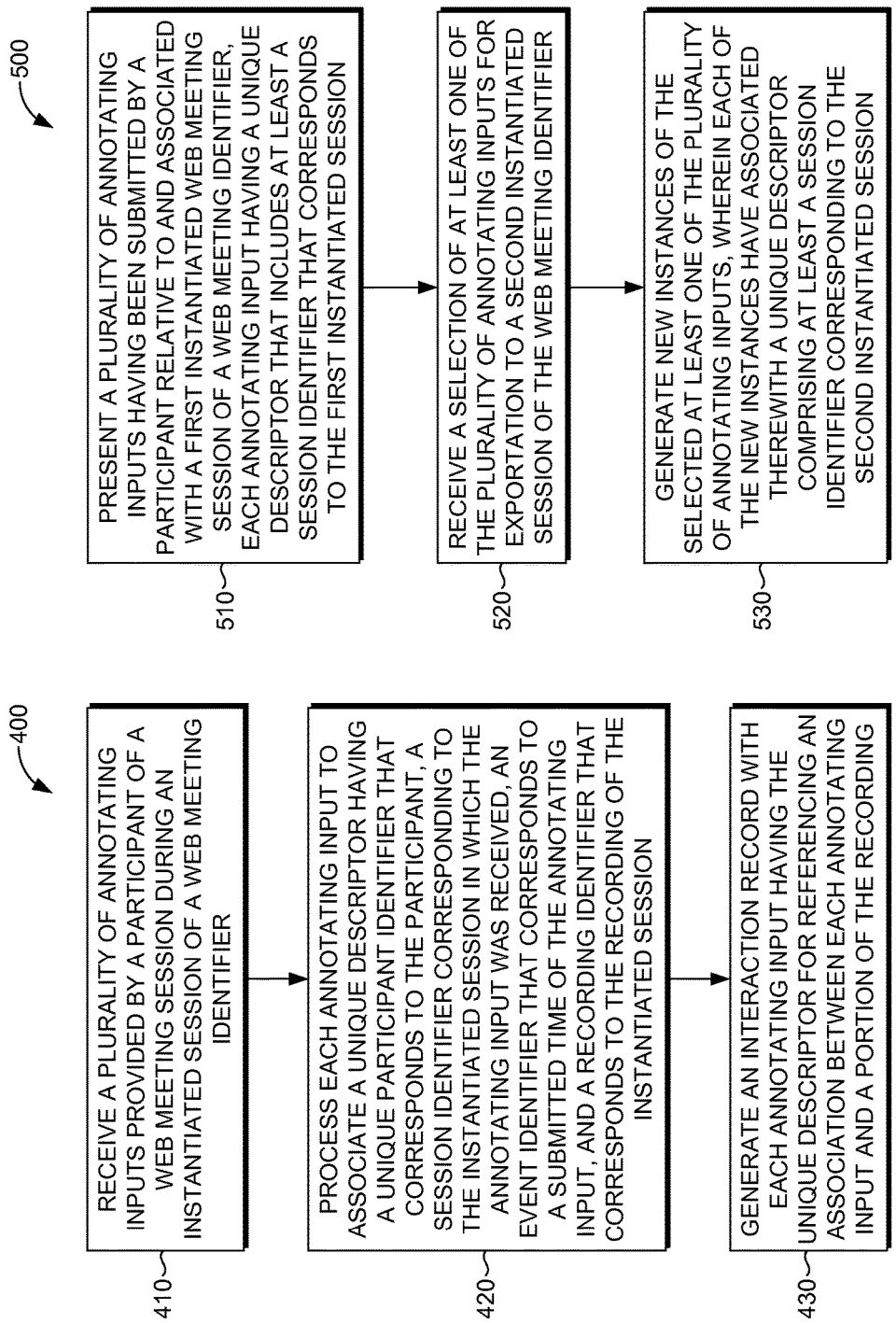

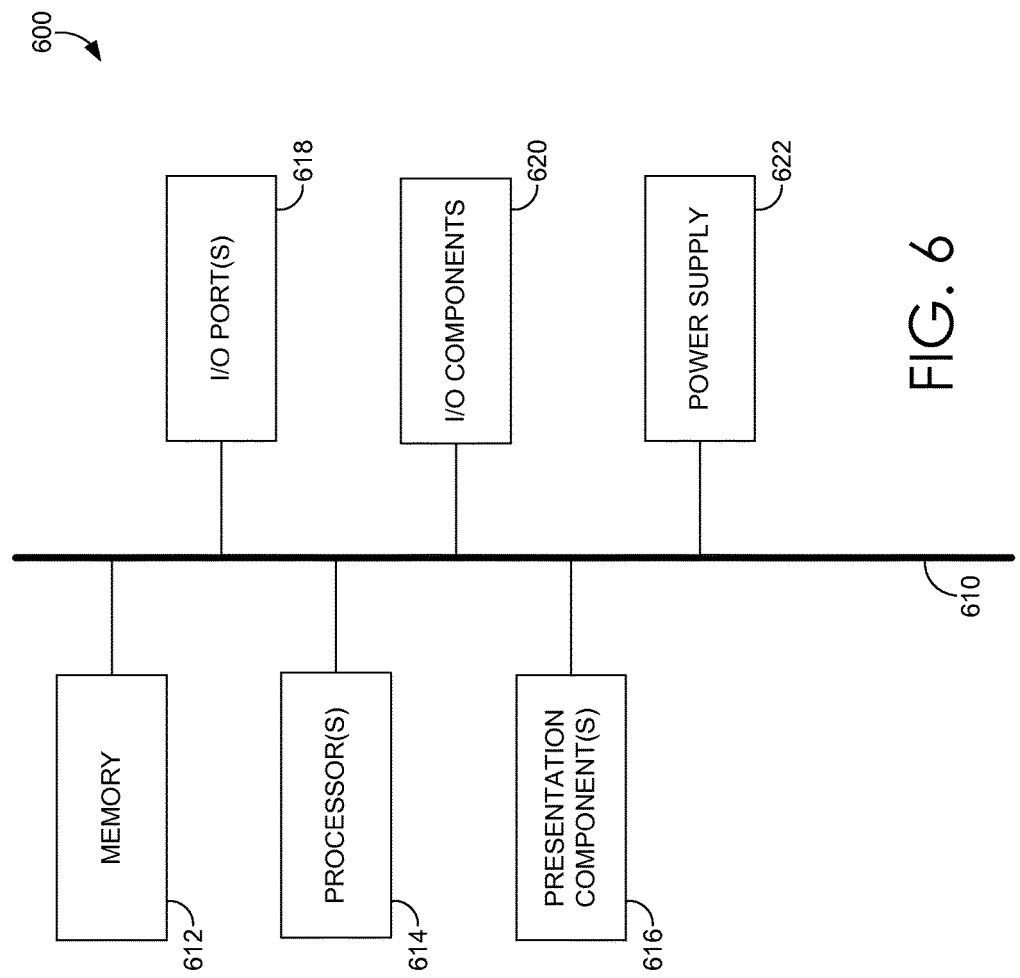

CONTEXTUALIZING INTERACTIONS IN WEB MEETING SESSIONS

BACKGROUND

In live web meetings, media, such as audio and video content, is typically streamed to a client device and presented to a web meeting participant. In streaming live web meetings, the media stream is typically delivered one-way, from a server location to each web meeting participant. Some web meeting solutions, such as Adobe® Connect, have implemented tools for web meeting participants to interact with each other and/or the presenter, typically through chat software or implementing voice over IP (VoIP) technologies. Web meeting solutions can even record live web meetings, so that participants can review the recording at a later time.

While a live web meeting is being streamed, participants may want to take notes using information gleaned from the meeting and to reference at a later time. While most participants will take notes using a pen and paper, some web meeting solutions have gone so far as to provide rudimentary note-taking tools (i.e., text editors). Notes taken using these note-taking tools result in a flat text document, functionally not very different than a piece of paper having notes hand-written thereon. When participants reference the notes that were taken during the live web meeting, there is a significant disconnect between each note and the context in which the note was taken. For example, if the presenter speaks a powerful phrase during the live web meeting and a particular word stands out to a participant, thereby prompting the participant to jot down the word in a note, the participant could completely forget why that note was taken when referencing the note a day, a week, or even months after the live presentation. Provided that the live meeting was recorded, the participant could playback a recording of the live meeting with hopes of providing some context to the note. Searching the recording, however, can be tedious and time-consuming.

Web meeting solutions may offer note-taking tools that provide participants with the ability to record notes taken during a live web meeting. In this regard, participants can retrieve notes that were taken during a recorded web meeting and later review these notes upon playback of the recording. For instance, if a participant created notes at minutes 5, 10, and 15 of a 20-minute presentation, the participant can playback a recording of the presentation and also review the notes that were recorded at minutes 5, 10, and 15 (i.e., showing up during playback of the recording). Similarly, presenters or administrators can employ such tools to prepare notes for display during a live web meeting or during playback of a web meeting recording. For instance, if the presenter or web meeting administrator wanted particular notes to appear to participants during relevant portions of a presentation, the notes would also need to be submitted at the time of recording to associate the note with the relevant playback portion of the recording.

Limiting notes to a particular recording, however, can be undesirably restrictive. For instance, if a presenter or web meeting administrator recorded a set of notes for a particular web meeting, and then wanted to import/export some or all of the same set of notes to another web meeting, current implementations restricting the association notes to a particular recording could pose a significant problem.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention are directed to providing improved access, review, and portability of notes for web meetings. More specifically, personal annotating inputs or "notes" can be associated with one or more web meeting "sessions" such that the personal annotating inputs are not bound to any particular recording. When associating personal annotating inputs to sessions instead of recordings, the personal annotating inputs or data therefrom can be handled independent of a recording. Once received, personal annotating inputs can be imported, exported, copied, deleted, and/or structured as a reusable template, in whole or in part, without being limited to a recording. In embodiments described herein, the personal annotating inputs can still be associated with portions of a recording for providing additional context thereto.

In accordance with embodiments described herein, web meetings can generally be directed to a particular subject or topic (i.e., virtual classrooms directed to a particular subject). Each subject or topic can be associated with a web meeting identifier. In embodiments, the web meeting identifier, corresponding to a particular subject or topic, can be instantiated into one or more sessions (i.e., a morning class and an afternoon class) attracting different participants or being presented by a different presenter. As such, one or more sessions can be associated to a single web meeting identifier. As presenters, administrators, or participants (each hereinafter referred to as "participants") of a web meeting session are "interacting" or making personal annotating inputs, each annotating input can be associated with the session so that they can be retrieved when referencing the session at a later time.

The term "annotating input" as referenced herein, is broadly used to describe input data provided by a participant of a web meeting session, which can be personal or shared with other participants. The annotating input can include individual inputs (e.g., letters, numbers, strings, sentences, bookmarks, etc.) or a set of inputs. The annotating input can be typed, written, and/or dictated. The annotating input can also be a bookmark for marking portions of a web meeting session or a caption for annotating portions of a web meeting session. In embodiments, and in accordance with embodiments described herein, the annotating input can be referenced as an input that is provided by a presenter or administrator and associated to various aspects of a web meeting session, as will be described.

In accordance with aspects of the present disclosure, annotating inputs submitted by a participant of a web meeting are received at any time relative to (e.g., before, during, after) an instance of the web meeting identifier (herein also referred to as a web meeting "session"). Moreover, each annotating input is a unique data object associated to a particular web meeting session. As such, annotating inputs are not directly associated with a recording of the streaming web meeting, but instead to an instantiated session of the web meeting identifier. In this regard, annotating inputs are emancipated from the recording, so that they may be reviewed and handled independent of the recording, as will be described.

In some embodiments, at least a portion of the web meeting session can be recorded, such that annotating inputs received during the recorded portion(s) are associated with a submission time. As one of ordinary skill in the art may appreciate, a recording can have a corresponding timeline tracking the start time of the recording to the finish time of the recording. In this regard, annotating inputs received during a recording are still primarily associated with a web meeting session, but can also retain an association to the recording for referencing a corresponding portion of the timeline, as will also be described.

Annotating inputs can each be processed to associate with a unique descriptor. The unique descriptor can include any or all of: a participant identifier that is unique to the submitting participant, a meeting identifier that corresponds to a particular topic or subject, a session identifier that corresponds to a particular instantiated session of a meeting identifier, an event identifier that corresponds to a time that the annotating input was submitted by the participant, and a recording identifier that corresponds to a recorded portion of the web meeting session. Each annotating input, having a unique descriptor associated therewith, can be stored to generate an interaction record.

In embodiments described herein, the interaction record includes some or all of the annotating inputs. In some embodiments, the interaction record can be employed to reference all annotating inputs corresponding to a particular web meeting session. In other words, any annotating input that was received in association to a particular web meeting session can be referenced. In other embodiments, the collection of annotating inputs can be further narrowed (e.g., by participant identifier) or broadened (e.g., by meeting identifier). The interaction record can be further employed to reference any portion of a recording that corresponds to any annotating input stored in the interaction record, provided that the annotating input is associated with a recording identifier.

The interaction record can be communicated to a participant, for instance, through a web meeting client, to view a collection of the participant's annotating inputs for any particular web meeting session. As the annotating inputs are not bound to any one particular recording, a collection of annotating inputs can be retrieved by the participant for each session, to perform various operations thereon. To this end, a participant could retrieve one or more annotating inputs for a first web meeting session (i.e., a morning session), and export/copy/move any number of the one or more annotating inputs to a second web meeting session (i.e., an afternoon session). It is contemplated that in such a transferring of annotating inputs between web meeting sessions, certain aspects of the unique descriptor may not transfer. For instance, session identifiers for each annotating input would no longer associate with the first web meeting session after being exported/copied/moved to a second web meeting session.

In some aspects, when viewing the collection of annotating inputs, the participant can reference particular portions of recordings associated with one or more of the annotating inputs to provide context thereto. In other words, the interaction record can be employed to provide jump points to portions of a recorded web meeting session. By selecting a particular annotating input from the interaction record, the participant can be provided with context to notes or other annotating inputs that were made by the participant during recorded portions of the live web meeting session, as will be described.

In embodiments described herein, a participant of a previously streamed web meeting session can be presented with a list of annotating inputs that were submitted by the participant associated with and relative to the web meeting session. A selection of one of the annotating inputs is received from the participant. Based on the selection having a recording identifier associated therewith, a portion of a recording of the web meeting session is determined to correspond to the participant's selected annotating input. The participant can then be presented with the portion of the recording that corresponds to the selected annotating input, so as to provide the participant with context to the annotating input.

In some embodiments described herein, one or more markers configured to identify each portion of the recording can be received by a participant. Each annotating input received from the participant is processed to associate with, among other things, an event identifier that corresponds or redirects to one of the markers. In this way, the interaction record can be employed to reference a marker, instead of a submission time, that corresponds to the participant's annotating inputs and further provide the participant context to inputs that were provided at the time of the web meeting session, as will be described.

BRIEF DESCRIPTION OF THE DRAWINGS

The present invention is described in detail below with reference to the attached drawing figures, wherein:

FIG. 4 is a flow diagram showing an exemplary method for providing context to annotating inputs made during a live streaming web meeting, in accordance with embodiments described herein;

FIG. 5 is a flow diagram showing an exemplary method for providing context to annotating inputs made during a live streaming web meeting, in accordance with embodiments described herein; and FIG. 6 is a block diagram of an exemplary computing device in which embodiments of the invention may be employed.

DETAILED DESCRIPTION

Figure 1:
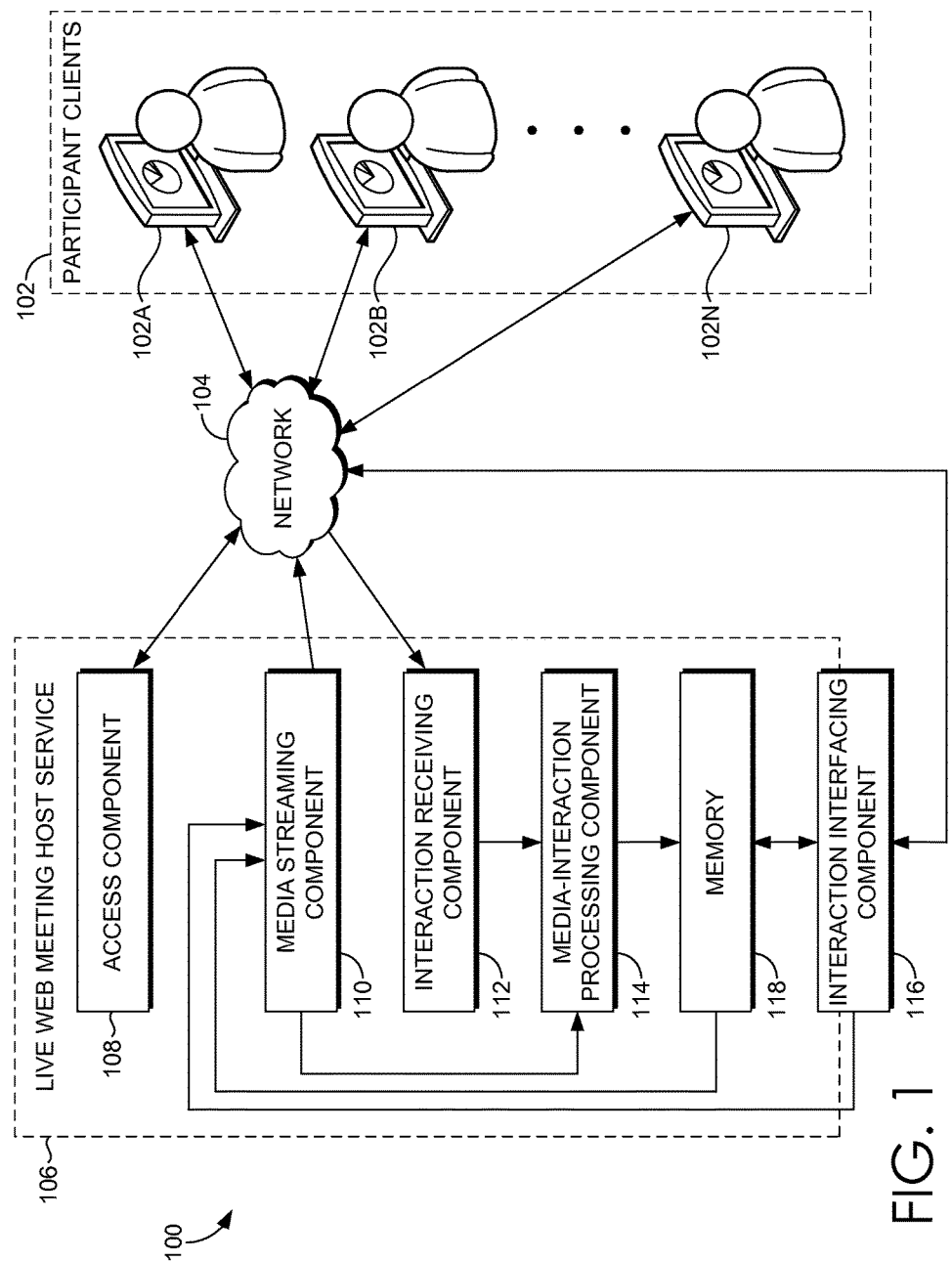
FIG. 1 is a block diagram of an exemplary operating environment for providing context to annotating inputs made during a live streaming web meeting, in accordance with embodiments described herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein are broadly directed to providing context to notes taken by participants relative to a web meeting session. When web meeting sessions are streamed, participants oftentimes take notes using information gleaned from the meeting presentation to reference at a later time. Though some web meeting solutions provide options to record participant notes submitted during the web meeting presentation, the notes are generally retrievable only upon playback of the web meeting presentation recording. As can be appreciated, there are significant limitations in restricting access to notes only upon playback of a presentation recording.

In general, aspects described herein relate to associating annotating inputs to a web meeting session. In some aspects, annotating inputs can be received before, during, or after a web meeting session. As long as annotating inputs are associated with a particular session, any reference to the session can recall any or all annotating inputs associated therewith. Annotating inputs can be generally associated to a session, such that any reference to a particular session can recall all annotating inputs associated therewith. Annotating inputs can be further associated to a recording of a web meeting session. In essence, if a presentation (e.g., slideshow, video, multimedia) is streamed as part of a web meeting session, and the presentation is recorded, one or more annotating inputs can be associated to a particular time of the recording.

In some aspects, a template for a web meeting identifier can be created so that web meeting sessions instantiated therefrom can inherit annotated inputs associated therewith. In other words, a participant (e.g., a presenter) can create a template by providing a set of annotating inputs directed to a particular subject or topic. A web meeting identifier can then be cloned from the template, thereby inheriting the notes and characteristics associated with the template. Subsequently, web meeting sessions can be instantiated from the web meeting identifier so that the participant can manage the set of notes inherited from the template.

In some other aspects, the annotating inputs can be utilized as "markers," for instance, a bookmark, a chapter marker, or a highlighted portion of a web meeting session. Following the live web meeting, when a participant is provided with a list of markers that were collected during a recording of the live web meeting, the participant can immediately reference the recorded portion of the web meeting session to supplement the annotating input with additional context.

Providing a user with access to annotating inputs made during a recorded web meeting session can greatly reduce the burden involved with searching the recording to provide context to an annotating input or "note" made during the web meeting session. For instance, if a participant note was taken 43 minutes and 26 seconds into streaming web meeting session, the note alone would not provide the participant with any context to the note. However, if the participant were able to immediately reference and review a recording of the web meeting session at or approximately near the 43 minute and 26 second marker, the note with complementary media would be much more valuable to the participant upon review.

Accordingly, in one aspect, an embodiment of the present disclosure is directed to a non-transitory computer storage medium storing computer-usable instructions that, when used by one or more computing devices, cause the one or more computing devices to perform operations for providing context to annotating inputs made during a web meeting session. The operations include receiving a plurality of annotating inputs provided by a participant during an instantiated session of a web meeting identifier, wherein at least a portion of the instantiated session is being recorded. Each annotating input is processed to associate with a unique descriptor. The unique descriptor is comprised of a participant identifier, a session identifier, an event identifier, and a recording identifier, as will be described in more detail herein. The annotating inputs are stored, with their unique descriptors, to generate an interaction record used for referencing portions of the recording based on corresponding annotating inputs. The interaction record can be communicated to the participant for referencing portions of the recording based on corresponding annotating inputs.

In another embodiment of the invention, an aspect is directed to a computer-implemented method for providing context to annotating inputs made relative to a web meeting session. The method includes presenting a plurality of annotating inputs submitted by a participant relative to a first instantiated session of a web meeting identifier. The web meeting identifier provides a framework from which all web meeting sessions instantiated therefrom are based. As described above, each annotating input has a unique descriptor associated therewith. The unique descriptors in each annotating input received relative to and associated with the first instantiated session includes a session identifier that corresponds to the first instantiated session. The method also includes receiving a selection of one or more annotating inputs from the presented plurality of annotating inputs for exportation to a second instantiated session of the web meeting identifier. Based on the selected one or more annotating inputs, new instances of the selected one or more annotating inputs are generated, each of the new instances having a unique descriptor comprising at least a session identifier that corresponds to the second instantiated session.

A further embodiment is directed to a computerized system for providing context to annotating inputs made relative to a web meeting session. The system comprises: one or more processors; and one or more computer storage media storing computer-useable instructions that, when used by the one or more processors, cause the one or more processors to: receive, prior to instantiating a session of a web meeting identifier, a plurality of annotating inputs submitted by a presenter of the web meeting session. Each of the annotating inputs received from the presenter are associated with a template identifier and stored into a unique content template. The web meeting identifier is generated based on the unique content template, such that the web meeting identifier inherits the plurality of annotating inputs associated with the template identifier. The presenter is provided with the plurality of annotating inputs associated with the template identifier upon instantiating the session of the web meeting identifier based on the unique content template.

In embodiments, the common infrastructure configuration for enabling web meetings includes a server and a plurality of clients, wherein the server can be configured to provide the plurality of clients with access to web meeting sessions and a source of streaming media comprising the web meeting subject matter (i.e., a live video of a presenting speaker, a live view of the presenter's slide deck, a presentation video, and other multimedia streams). In some instances, the presentation is originated at the site of the server. In some other instances, however, the infrastructure can support a remotely presenting client, such that the live presentation can be streamed from the remotely presenting client to a session instantiated on the server, and simultaneously distributed to the plurality of clients from the server in near real-time. Irrespective of where the presentation originates, the media stream is generally delivered to the clients of a web meeting session by way of the server. To this end, the server, in most instances, is configured to record the multimedia stream, such that the multimedia stream can be played back at a later time by viewing participants or by those who were unable to participate in the web meeting session. Although the media stream is generally delivered to the clients by way of a server, it is contemplated that a peer-to-peer configuration is also within the scope of embodiments described herein. That is, any particular client can be configured to provide the functionalities of a server, as described.

By associating annotating inputs with web meeting sessions instead of web meeting recordings or identifying references thereof, annotating inputs can be created without requiring a recording of the web meeting and accessed without requiring playback of the recording. Similarly, the annotating inputs can be searched and accessed independent of a recording. In the event that any portion of the web meeting is recorded, accessing annotating inputs can provide jump points to relevant portions of the recorded web meeting, as will be described. Further, annotating inputs can be exported, imported, and generally accessed as an entity independent of any relationship to a web meeting or recording thereof. In accordance with embodiments described herein, FIG. 1 illustrates an exemplary operating environment 100 in which some embodiments of the present disclosure may be employed. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 includes a plurality of user clients or "participants" 102 (individually 102a, 102b, 102n) that access a web meeting session over a network 104 (e.g., the Internet). In this example, a web meeting host service 106 provides the web meeting presentation by streaming the subject multimedia to the participants 102. In embodiments, the host service 106 can, among other things, instantiate web meeting sessions based on a web meeting identifier, limit access to the participants based on login credentials associated with each participant, record content of a web meeting session for subsequent replay, and receive and process annotating inputs from each participant. The host service 106 may be implemented in one or more computing devices comprising the following conceptual components: an access component 108 for controlling access to the hosted content and also for associating a unique identifier to each participant; a media streaming component 110 for delivering live or recorded "presentation" media over a network; an interaction receiving component 112 for receiving annotating inputs from participants over the network; a media-interaction processing component 114 for processing each annotating input and associating identifying information therewith; an interaction interfacing component 116 for communicating annotating input data over the network to participants; and a memory 118.

Figure 2A:
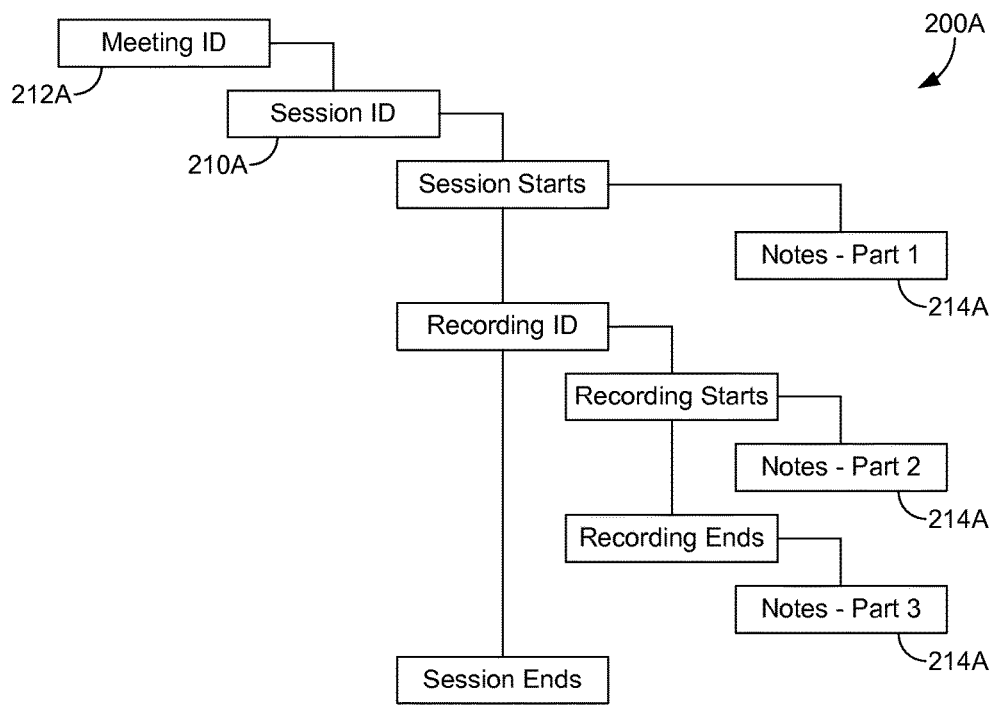
FIGS. 2A-2B are block diagrams illustrating exemplary data structures for a web meeting session and a web meeting template, in accordance with embodiments described herein.

The web meeting session data structure 200a of FIG. 2A, briefly described herein above, illustrates that web meeting sessions 210a are instances of a web meeting identifier 212a. The web meeting identifier 212a, as referenced herein, is generally associated with a predefined topic or subject, and provides a framework from which all web meeting sessions 210a instantiated therefrom will inherit. In other words, the web meeting identifier 212a can include predefined annotating inputs 214a, titles, font and formatting parameters, or other web meeting characteristics. Any number of web meeting sessions 210a can be instantiated from a web meeting identifier 212a, with each web meeting session 210a being unique but sharing a common association to a web meeting identifier 212a. For instance, a web meeting identifier 212a can be associated to a single topic, such as "Algebra 101." The web meeting identifier 212a can include any number of characteristics unique to the "Algebra 101" class (e.g., title, format, layout, predefined content, annotating inputs, etc.). In this regard, any web meeting session 210a instantiated from the "Algebra 101" web meeting identifier 212a will inherit all characteristics defined by the "Algebra 101" framework.

Figure 2B:
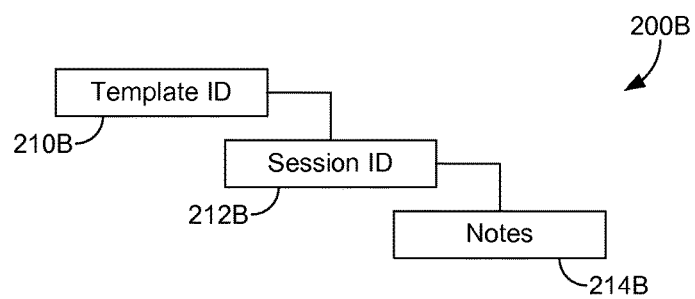

In some aspects, the web meeting session data structure 200a can inherit characteristics of a preconfigured web meeting template, as illustrated in template identifier data structure 200b of FIG. 2b. In other words, a participant can create a web meeting template 200b, having a template identifier 210b associated therewith, and further associate any number of annotating inputs 212b, formatting characteristics, layouts, etc., therewith, so that the template 200b can be used to create web meeting identifiers based on the template. By creating web meeting identifiers based on a template, web meeting sessions 214b instantiated therefrom can inherit the underlying characteristics and annotated inputs 212b associated with the template 200b. In other words, a participant (e.g., a presenter) can create a template 200b by providing a set of annotating inputs 212b directed to a particular subject or topic. A web meeting identifier (for instance, web meeting identifier 212a of FIG. 2a) can then be cloned from the template 200b, thereby inheriting the notes 212b and characteristics associated with the template 200b. Subsequently, web meeting sessions 210a can be instantiated from the web meeting identifier 212a so that the participant can manage the set of notes inherited from the template 200b.

Users allowed to participate in a web meeting session are typically pre-registered and/or provided with unique login credentials to access the web meeting session. With brief reference back to FIG. 1, host service 106 may employ an access-limiting feature, such as implemented by access component 108, which requires participant login credentials to view an ongoing web meeting session or a previously recorded session. Login credentials can include unique usernames, passcodes, access codes, or any combination thereof. In some instances, if a single login and/or password is provided to a group of participants, each participant in the group could potentially be assigned a unique identifier, by the server, based on characteristics detected in their network connection (e.g., IP address, MAC address, web-browser identifier, etc.). In this regard, each participant is provided with a login credential that can be used to login to the server and participate in a web meeting session, and further used to login to the server at a later time to view a recording of the web meeting session and/or review personal notes recorded relative to and associated with the web meeting session, as will be described. Each participant can thus be tracked by the server to provide features in accordance with the present disclosure.

In embodiments, the web meeting session is a streaming webcast, typically configured with an audio and/or video media streamed through a network for mass distribution to a plurality of clients. In some embodiments, the web meeting session is a prerecorded presentation media that is provided to one or more participants upon request, the web meeting session having a recording associated therewith. In other embodiments, the web meeting session is "live" in that the web meeting session content is being "presented" or created substantially simultaneous to being streamed from a source (i.e. a server) to one or more client participants that are logged in at the time of streaming, the web meeting session being recorded as it is streamed and resulting in a recording associated with the web meeting session.

In some configurations, client participants have the ability to communicate amongst one another and sometimes with the presenter to create an interactive meeting environment. To this end, client participants are provided not only with an interface for viewing the multimedia stream delivered (for instance, from media streaming component 110), but also with an input interface for inputting annotating data (e.g. notes) with the meeting environment. In some instances, the presenter participant can also have the ability to communicate with participants. For instance, a presenter can provide annotating inputs that can be provided to client participants at any time relative to (i.e., before, during, or after) a web meeting session.

Input interfaces used by participants of a web meeting session can employ various components that facilitate interactive inputs between one participant to another participant, one participant to many participants, or even one participant to his/herself, as will be described. In the case of inputs involving one participant to another or one participant to many participants, implementations may involve components that facilitate two-way chatting (i.e., asking questions, live discussions, live feedback, submitting survey data, etc.) or vocal exchanges (i.e., voice over IP) among participants of the web meeting session.

With particular regard to inputs involving one participant to his/herself, interaction receiving component 112 can be implemented to facilitate the reception of annotating inputs during a live web meeting session. In more detail, a participant may want to take personal notes, or create personal markers, in reference to the web meeting session. To this end, an input interface can be provided to the participant for submitting annotating inputs to the server during the web meeting session. The interaction receiving component 112 would preferably receive the participants' annotating inputs and store the annotating inputs on the server memory, with access to the annotating inputs, in some cases, being limited to the participant from which the annotating inputs were received.

As is described, annotating inputs personal to participants can include, among other things, the participant's personal notes related to the web meeting session or a designated marker for marking a portion of the web meeting session (e.g., a bookmark, a highlight, a chapter, a step in a series of steps, etc.). In some embodiments, at least some of the annotating inputs can be provided by a presenter or an administrator during a live web meeting session to mark relevant portions of the web meeting session. For instance, if a presenter wanted to mark chapters or steps of her live streaming presentation, she could do so in real-time utilizing an interaction receiving component 112 configured specifically for presenters or administrators of the system. In such embodiments, it is contemplated that the annotating inputs would be provided as generally available to all participants of the particular web meeting session and a recording thereof. It is also contemplated that a presenter could employ the interaction receiving component 112 in a personal session (i.e., a practice run) and record the personal session such that any or all annotating inputs applied to the web meeting session are subsequently available to participants of the recorded web meeting session.

After a participant provides personal annotating inputs during a web meeting session, it is contemplated that the participant will want to review the annotating inputs subsequent to the session. The interaction interfacing component 116 can be configured to provide each participant with processed annotating input data, as will be described herein. Although the personal annotating inputs may be useful to the participant when referenced shortly after the live web meeting session, it is quite likely that they will not be particularly useful to the participant when reviewed long after the live session has expired. For example, if a live web meeting session participant submits, as an annotating input, several seemingly important words of a keynote speech to reference at a later time, the participant might reference these words several months later with no idea why the annotating inputs were made, or in what context they were significant to the participant.

Embodiments of the disclosure provided herein provide for the automatic association of unique descriptors to annotating inputs as they are provided by the participant. In some embodiments, the unique descriptors can be automatically associated to annotating inputs as they are received by the host server. In the described embodiments, annotating inputs are received by the interaction receiving component 112 and passed to the media-interaction processing component 114 for additional processing (i.e., associating with unique descriptors), as will be described. These unique descriptions are associated to each annotating input, which can be referenced by the participants to provide contextual information in accordance with embodiments described herein.

In some instances, it is contemplated that each annotating input can also be used as a participant's navigational tool, to jump to a particular portion of a recording to provide additional context to a selected annotating input. The interaction interfacing component 116 can be configured to provide annotating input data over the network to participants, for viewing, and further be configured to receive one or more participant selections of annotating input(s), as will be described. In more detail, the interaction interfacing component 116 can receive search parameters (i.e., one or more keywords) from a participant to search annotating inputs that were provided by them or in some instances, another participant. The interaction interfacing component 116 can also provide a participant client with an entire list, or a limited list based on the search parameters, of annotating inputs associated with the participant and a particular recording. Finally, the interaction interfacing component 116 can be configured to receive at least one selection of an annotating input of interest to the participant, for further processing, as will be described.

Figure 3:
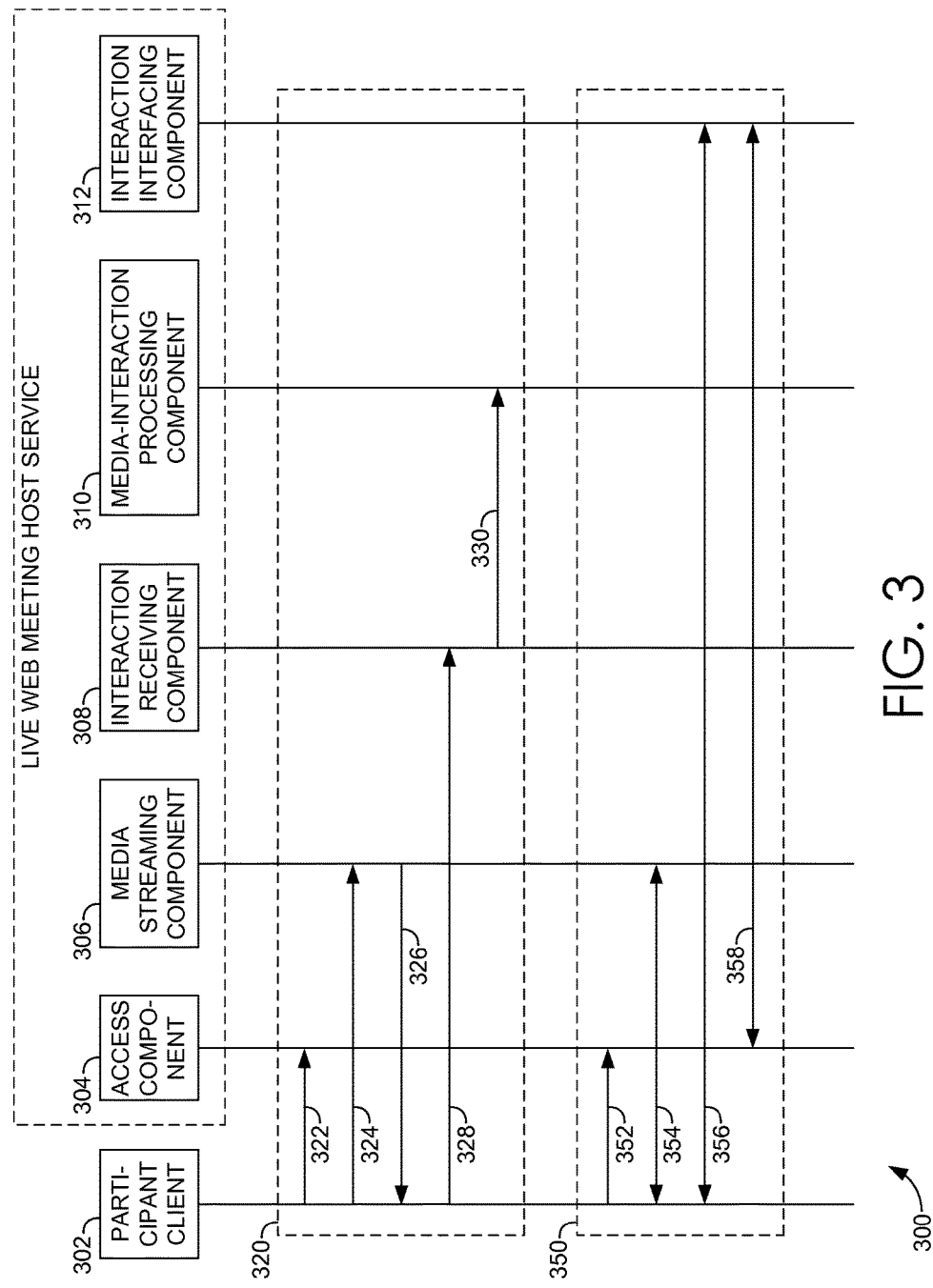
FIG. 3 is a ladder diagram illustrating an exemplary flow of data between components of the operating environment in accordance with embodiments described herein.

Moving now to FIG. 3, a flow diagram 300 is provided illustrating an exemplary flow of data between components of the operating environment 100 of FIG. 1. In flow group 320, the directional stream of data between components when streaming content in the web meeting session to participants while collecting annotating inputs therefrom is provided. Although the network component 104 of FIG. 1 is not illustrated in FIG. 3, it is contemplated that any or all communications between components can take place directly or through the network 104. The provided diagram is merely exemplary and not intended to be limiting, as it is contemplated that communication between components can be bidirectional.

Group 320 illustrates the transactional flow between components of operating environment 100 of FIG. 1 when streaming content in the web meeting session to participants while collecting annotating inputs therefrom. In more detail, the client 302 is configured to initiate communications with the host service via the server access component 304, as illustrated in 322. As described, initial communications between the participant client 302 and host service can be negotiated by verifying access credentials regulated by access component 304. In the event the participant's access credentials are rejected, the participant client 302 is denied access to the web meeting session. In the event the participant's access credentials are accepted, the client 302 is granted access to the media streaming component 306 for accessing the web meeting session and content therein, as illustrated in 324.

Moving forward, the media stream component 306 is configured to stream the web meeting session content to the participant client 302, as illustrated in 326. Irrespective of the source being streamed from a live feed or streamed as a recording, the stream can begin at a predetermined time and end at a predetermined time for individual or all participants. In embodiments where the web meeting session content is live and streamed through the media stream component 306, the host service is operable to record or store the web meeting session content and received annotating input data into memory. In other embodiments, where the web meeting content is prerecorded and streamed through the media stream component 306, the host service is operable to record or store the annotating input data into memory. In embodiments, the recorded and stored live web meeting session content can be assigned a unique meeting identifier by the media stream component 306 or other component of the host service. It is further contemplated that the meeting identifier can be a function of the metadata associated with the web meeting session content, such as, for example, the filename, content duration, creation date, checksum identifier, or any combination thereof.

Provided that the participant client 302 has been granted access to the server (as illustrated in 324) and session, and is receiving the web meeting session stream (as illustrated in 326), the interaction receiving component 308 of the host service is configured to receive annotating inputs from the participant client 302, as illustrated in 328. As annotating inputs are provided by the participant client 302, the participant client 302 can be configured to tag each annotating input with a timestamp corresponding to a submitted time of the annotating input. In some embodiments, the annotating inputs can be individually tagged by other components of the host service upon receipt of the annotating inputs, such as the interaction receiving component 308 or the media-interaction processing component 310. Preferably, the annotating inputs are tagged with a timestamp that is substantially in sync with (e.g., within 2 seconds of) a provided time of the annotating input.

Associating or "tagging" the annotating inputs with a timestamp can be used for determining a precise time that the annotating input was provided with respect to the streamed content of the web meeting session. As annotating inputs are received and tagged with a timestamp, they can be processed by the media-interaction processing component 310, as illustrated in 330. As was described, any and all components of the host service can be in communication with each other. As such, the media-interaction processing component 310 can query information from at least the server access component 304, media streaming component 306, and/or interaction receiving component 308.

The media-interaction processing component 310 can be configured to assign or associate one or more annotating inputs with a unique descriptor that is unique to the one or more annotating inputs. In more detail, the unique descriptor can include any number or type of unique identifiers including a unique participant identifier corresponding to the participant responsible for submitting the annotating input, a session identifier corresponding to the instantiated session in which the annotating input was received, an event identifier corresponding to a submitted time of the annotating input, and/or a unique recording identifier corresponding to a recording of the instantiated web meeting session.

The unique descriptor can be associated with an annotating input by, among other methods, modifying metadata associated with each annotating input, restructuring file characteristics (i.e., file names) of the annotating input, or associating with a unique identifier of the annotating input using a relational database. For instance, in embodiments where each annotating input is stored as an individual file, it is contemplated that each annotating input has a modifiable metadata associated therewith. As such, the metadata can be configured to identify: a particular participant from which the annotating input was submitted (a unique participant identifier), a particular web meeting session (a session identifier) or recording thereof during which the annotating input was made (a recording identifier), and a timestamp relating the annotating input to a particular portion of the web meeting session or recording thereof (an event identifier).

It is also contemplated that file characteristics associated with each annotating input can be modified to include the unique descriptor. For example, if participant A was participating in a web meeting session titled "MEETING-101," and provided an annotating input noting "very interesting point/I like this" at 12:45 PM on Apr. 1, 2015, the file name associated with the annotating input can be renamed A.MEETING-101.2015-04-01T12:45:00.00.RECORDING_MEETING-101. In this example, the file name indicates an annotating input by participant "A," for session "MEETING-101," submitted at 12:45 PM on Apr. 1, 2015, and the note being associated to recorded file "RECORDING_MEETING-101." In some instances, the unique descriptor may include some blank fields if an identifier is not included. For example, if the above annotating input was provided by presenter "A" before a recorded portion, the file name associated therewith can be named A.MEETING-101.x.x. In this example, the A.MEETING-101.x.x annotating input is still associated with the MEETING-101 session and can be referenced by filtering annotating inputs having the MEETING-101 identifier. As the above are merely exemplary embodiments, they are not intended to be limiting as any order or configuration of identifiers can be used in accordance with embodiments described herein.

It is further contemplated that each annotating input can be stored into a relational database and associated with a unique descriptor by way of the relational database. In more detail, as each annotating input is received, it can be stored as an entry into a table of the database and assigned a unique descriptor, also known as a primary key or unique key. The unique descriptor, in this sense, can be employed to relate to and identify additional fields in the relational database that can identify a particular participant from which the annotating input was submitted, a particular web meeting session or recording thereof during which the annotating input was made, and a timestamp relating the annotating input to a particular portion of the web meeting session or recording thereof.

In some embodiments, additional or alternative to a timestamp, a unique event identifier that references a particular marker that is closest in time to the annotating input is considered within the scope of embodiments described herein. Preferably, the marker closest in time will precede the submitted time of the annotating input. For instance, if markers were provided to mark particular chapters of a presentation and a participant made numerous annotating inputs disbursed throughout the duration of the presentation, each annotating input could correspond to a unique event identifier that pointed to a marker immediately preceding the time that the annotating input was submitted. In more detail, assume that markers were created as such: Chapter 1@15: 00:00, Chapter 2@32:10:01; Chapter 3@54:03:02, etc. If a participant submitted an annotating input at 27:11:15, the unique event identifier would default to 15:00:00, such that Chapter 1 would be associated to the annotating input.

As the annotating inputs are processed by media-interaction processing component 310 and are assigned unique descriptors, the annotating inputs are stored in a memory, such as memory 118 of FIG. 1, or in a relational database as described. The storing of annotating inputs facilitates a generation of an interaction record, which comprises the plurality of annotating inputs. It is contemplated that the interaction records can also be constructed in various configurations, for example, having separate interaction records for each participant, separate interaction records for each web meeting session or recording thereof, or any combination thereof.

As described, the interaction record can serve as a record of all annotating inputs made by all participants, by one participant, relative and associated to all web meeting sessions, relative and associated to one web meeting session, or any combination thereof. The interaction record can be a single file having annotating inputs or instances of annotating inputs stored therein, a plurality of files each comprising an annotating input, or a database including all annotating inputs, each comprised of annotating inputs having unique descriptors associated therewith. The unique descriptors, as described, can identify annotating inputs themselves, and further identify portions of a previously streamed web meeting session or a recording thereof when the annotating input itself is used as a search parameter after the live web meeting or recording is streamed. Such implementations can be useful to provide context to a previously recorded annotating input.

In embodiments, at least portions of the interaction record or an instance thereof can be communicated to a client device, a participant, or another component of the host server for providing additional context to annotating inputs made by one or more participants of a web meeting session after content from the web meeting session was streamed to the participant. Interaction interfacing component 312 can be configured to communicate the interaction record data to facilitate the provision of context to previously submitted annotating inputs associated with a recorded portion of the web meeting session, as will be described.

Continuing with FIG. 3, flow group 350 is provided to illustrate an exemplary flow of data between components of the operating environment 100 of FIG. 1. In flow group 350, the directional stream of data between components when participants are accessing a recording of a previously streamed web meeting session where participants submitted personal annotating inputs is provided. Although the network component 104 of FIG. 1 is not illustrated in FIG. 3, it is contemplated that any or all communications between components can take place directly or through the network 104. The provided diagram is merely exemplary and not intended to be limiting, as it is contemplated that communication between components can be bidirectional.

Group 350 illustrates the transactional flow between components of operating environment 100 when participants access a recording of a previously streamed web meeting session, wherein annotating inputs were made. In more detail, the client 302 is configured to initiate communications with the server via the server access component 304, as illustrated in 352. As described, initial communications between the participant client 302 and host service are negotiated by verifying access credentials regulated by access component 304. In the event the participant's access credentials are rejected, the participant client 302 is denied access to the recording, among other things. In the event the participant's access credentials are accepted, the client 302 is granted access to the media streaming component 306 for accessing a recording or recorded portion of the previously streamed web meeting session, as illustrated in 354.

When accessing recordings of previously streamed web meeting sessions, the client 302 can also be granted access to interaction interfacing component 312 of the host service, as illustrated in 356. As described, the interaction interfacing component 312 is configured to provide each participant 302 access to at least a portion of an interaction record or an instance thereof. In some cases, the access is limited in the sense that each participant has privileges to view instances or representations of their own previously submitted annotating inputs. In other cases, if the participant has presenter or administrative privileges, the participant's annotating inputs can be configured to be accessible to all participants of any particular web session or recording thereof. In some embodiments, the interaction interfacing component 312 may communicate with the server access component 304 to determine which unique participant identifier is associated with the participant client, as illustrated in 358.

The participant client 302 is presented with a list of annotating inputs associated with the participant's personally-submitted or accessible annotating inputs. The list of annotating inputs presented to the participant is derived from the interaction record and can include representations or instances of the annotating inputs. For instance, the list can be provided as a result of a keyword search performed on all annotating inputs, or the list can be limited by a particular recording of a previously streamed web meeting session. In essence, the list of annotating inputs can be sorted or filtered based on any characteristic defined by the annotating inputs' unique descriptors as described herein.

As was described, each instance or representation of an annotating input pulled from the interaction record now has a unique descriptor associated therewith. As such, any annotating input or representation thereof selected by a participant can be employed as a search parameter to retrieve a relevant portion of the recorded web meeting session. As was used in a previous example, if participant A had participated in web meeting session titled "MEETING-101" that was recorded as "RECORDING_MEETING-101," and submitted an annotating input noting "very interesting point/I like this" at 12:45 PM on Apr. 1, 2015, the time of the streaming web meeting session, the file name (or indication thereof) associated with the annotating input could be named A.MEETING-101.2015-04-01T12:45:00.00.RECORDING_MEETING-101. By way of example only, the participant may see, via a user interface, a list of annotating inputs that were made for MEETING-101, and within the list the participant may see annotating input "very interesting point/I like this." The annotating input alone would not likely provide the participant with any clues as to why this annotating input was submitted. As such, the participant would want to reference a portion of the recorded web meeting session to provide context to the annotating input.

The participant client 302 can thus provide a selection of one of the listed annotating inputs and notify the interaction interfacing component 312 of the selection. Upon receipt of the selection, the interaction interfacing component 312 can be configured to determine, on its own or in conjunction with other components of the host service, the portion of the recording corresponding to the selected annotating input or representation thereof. To determine which portion of the recording corresponds to the selected annotating input, the unique descriptor associated with the annotating input is analyzed.

In more detail, the annotating input's unique descriptor will include identifying information pointing to the particular recording of the web meeting session and a particular recorded timestamp with respect to the recording. Referring to the "MEETING-101" example above, a recording called "RECORDING_MEETING-101" corresponding to session "MEETING-101" can be retrieved and a portion of the recording starting at 12:45 PM corresponding to the portion of the web meeting that was streamed at approximately 12:45 PM on Apr. 1, 2015 can be queued for playback to the participant. In some embodiments, a preset playback buffer can be provided by subtracting time from the timestamp (e.g., 5, 10, 20, 30, 60 seconds) to provide some lead time before the relevant portion is played back. In some aspects, playback of the relevant portion can begin immediately upon receipt of the selected annotating input, to provide context to the annotating input selected by the participant.

Turning now to FIG. 4, a flow diagram is provided that illustrates a method 400 for providing context to annotating inputs made relative to (i.e., before, during, or after) a web meeting session. Initially, at block 410, a plurality of annotating inputs provided by a participant of a web meeting session is received during an instantiated session of a web meeting identifier. At block 420, each annotating input is processed to associate a unique descriptor therewith. The unique descriptor can include a unique participant identifier that corresponds to the participant, a session identifier corresponding to the instantiated session in which the annotating input was received, an event identifier that corresponds to a submitted time of the annotating input, and a recording identifier that corresponds to the recording of the instantiated session. At block 430, each annotating input having the unique descriptor is stored to generate an interaction record. The interaction record comprises the plurality of annotating inputs having unique descriptors corresponding therewith. The interaction record can be referenced to associate each annotating input to a portion of the recording.

Turning now to FIG. 5, a flow diagram is provided that illustrates a method 500 for providing context to annotating inputs made relative to a web meeting session. Initially, at block 510, a plurality of annotating inputs having been submitted by a participant relative to and associated with a first instantiated web meeting session of a web meeting identifier is presented. Each annotating input has associated therewith a unique descriptor that includes at least a session identifier that corresponds to the first instantiated session. At block 520, a selection of at least one of the plurality of annotating inputs is received for exportation to a second instantiated session of the web meeting identifier. At block 530, new instances of the selected at least one of the plurality of annotating inputs are generated, wherein each of the new instances have associated therewith a unique descriptor comprising at least a session identifier corresponding to the second instantiated session.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, providing context to annotating inputs made during a live streaming web meeting. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations for facilitating portability of web meeting interactions, the operations comprising:
   receiving, from a client device that is associated with a participant identifier, at least a first annotating input for a first instance of a web meeting identifier, wherein the received first annotating input is stored independently from a recording of a first web meeting that corresponds to the first instance;
   processing the received first annotating input to include therein a first unique descriptor that references the participant identifier, the first instance, a time, and the recording;
   generating an interaction record that includes the processed first annotating input;
   transmitting, to the client device, at least a first portion of the interaction record that includes the processed first annotating input;
   receiving, from the client device to export to a second instance of the web meeting identifier, the processed first annotating input selected from the transmitted first portion of the interaction record;
   generating a second annotating input that is based on a portion of the selected first annotating input, the generated second annotating input including a second unique descriptor that at least references the second instance; and
   providing, to the client device for the second instance of the web meeting identifier, at least a second portion of the interaction record that includes the generated second annotating input, the generated second annotating input to be provided in a second web meeting that, when instantiated, corresponds to the second instance, wherein the first meeting and the second web meeting are different occurrences.

2. The medium of claim 1, wherein the web meeting identifier is a topical framework from which all instances thereof are based.

3. The medium of claim 2, wherein the topical framework is based on a particular topic or a particular subject.

4. The medium of claim 1, wherein the time is a timestamp.

5. The medium of claim 1, wherein the time references a corresponding portion of the recording.

6. The medium of claim 1, wherein each annotating input is one of a note and a marker.

7. The medium of claim 1, wherein each instance of the web meeting identifier inherits characteristics of the web meeting identifier, the characteristics including at least one of a predefined annotating input, a title, a font, and a formatting parameter.

8. The medium of claim 7, wherein the web meeting identifier is cloned from a custom template that defines the inherited characteristics.

9. The medium of claim 8, the operations further comprising:
   receiving, from another client device associated with a presenter identifier, at least one characteristic to define the template.

10. A computer-implemented method for facilitating portability of web meeting interactions, the method comprising:

providing for display, by a client device associated with a participant identifier, at least a first portion of an interaction record received from a server device, wherein the first portion of the interaction record includes a first annotating input associated with a first instance of a web meeting identifier, and wherein the first annotating input includes a first unique descriptor that references the participant identifier, the first instance, and a time;

transmitting, by the client device and to the server device, a selection from at least the first portion of the interaction record, the selection including the first annotating input and transmitted to export at least the selected first annotating input to a second instance of the web meeting identifier; and providing for display, by the client device for the second instance, at least a second portion of the interaction record received from the server device, wherein the second portion includes a second annotating input generated by the server device based on a portion of the selected first annotating input, wherein the second annotating input includes a second unique descriptor that at least references the second instance, wherein the web meeting identifier defines a topical framework from which each instance thereof, including the first instance and the second instance, inherits its characteristics, and wherein each instance of the web meeting identifier corresponds to one occurrence of a web meeting.

11. The method of claim 10, wherein the first unique descriptor further references a recording of the first instance, wherein the recording is stored independent of the first annotating input.

12. The method of claim 10, wherein the first portion of the interaction record further includes at least one predefined annotating input inherited from the web meeting identifier, the at least one predefined annotating input being inherited upon instantiation of the first instance.

13. The method of claim 12, wherein the at least one predefined annotating input is defined by another client device associated with a presenter identifier.

14. The method of claim 12, wherein the web meeting identifier further defines characteristics inherited by each instance thereof, the characteristics being defined by a custom template from which the web meeting identifier was cloned.

15. The method of claim 14, wherein the characteristics include at least one of a predefined annotating input, a title, a font, and a formatting parameter.

16. A computerized system for facilitating portability of web meeting interactions, the system comprising:

one or more processors; and one or more computer storage media storing computer-usable instructions that, when used by the one or more processors, cause the one or more processors to:

receive, from a first client device associated with a presenter identifier, at least one web meeting characteristic to define a template;

instantiate a first instance of a web meeting identifier that is based on the defined template, the web meeting identifier being a topical framework from which all instances thereof are based;

instantiating a first web meeting that corresponds to the first instance and that exhibits the at least one web meeting characteristic;

receive, from a second client device associated with a participant identifier, at least a first annotating input for the first web meeting to associate with the first instance, wherein the received first annotating input is stored independently from a recording of the first web meeting that corresponds to the first instance;

process the received first annotating input to include a first unique descriptor that at least references the first instance;

generate at least a first portion of an interaction record that includes the processed first annotating input; and provide, to the second client device, at least the generated first portion of the interaction record to facilitate an export of the processed first annotating input to at least a second instance of the web meeting identifier that is based on the defined template, wherein, when a second web meeting is instantiated for the second instance, the second web meeting corresponds to the second instance and exhibits the at least one web meeting characteristic.

17. The system of claim 16, the first unique descriptor further referencing the participant identifier, a time, and the recording.

18. The system of claim 16, wherein the instructions further cause the one or more processors to:

generate a second annotating input based on a portion of the first annotating input selected by the second client device to export to the second instance, the generated second annotating input including a second unique descriptor that at least references the second instance.

19. The system of claim 18, wherein the instructions further cause the one or more processors to:

provide, to the second client device and for the second instance, at least a second portion of the interaction record that includes the generated second annotating input.

* * * * *